(12) United States Patent
Sahai et al.

(10) Patent No.: US 7,272,626 B2
(45) Date of Patent: Sep. 18, 2007

(54) E-SERVICE MANAGEMENT THROUGH DISTRIBUTED CORRELATION

(75) Inventors: Akhil Sahai, Santa Clara, CA (US); Jinsong Ouyang, Roseville, CA (US); Vijay Machiraju, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1575 days.

(21) Appl. No.: 09/885,658

(22) Filed: Jun. 19, 2001

(65) Prior Publication Data

US 2003/0009545 A1    Jan. 9, 2003

(51) Int. Cl.
G06F 15/16 (2006.01)
G06F 15/173 (2006.01)

(52) U.S. Cl. .................................. 709/201; 709/202

(58) Field of Classification Search ................ 709/224, 709/201, 202; 705/26, 75, 64
See application file for complete search history.

(56) References Cited

U.S. PATENT DOCUMENTS

| | | | |
|---|---|---|---|
| 6,041,352 A * | 3/2000 | Burdick et al. ............. | 709/224 |
| 6,108,700 A | 8/2000 | Maccabee et al. .......... | 709/224 |
| 6,115,690 A * | 9/2000 | Wong ............................. | 705/7 |
| 6,687,848 B1* | 2/2004 | Najmi ........................... | 714/4 |
| 6,950,809 B2* | 9/2005 | Dahan et al. ................. | 705/76 |
| 7,051,094 B1* | 5/2006 | Sahai et al. .................. | 709/223 |
| 2002/0077919 A1* | 6/2002 | Lin et al. ...................... | 705/26 |
| 2002/0087340 A1* | 7/2002 | Boubez et al. ................ | 705/1 |
| 2002/0091580 A1* | 7/2002 | Wang .......................... | 705/26 |
| 2002/0111814 A1* | 8/2002 | Barnett et al. ................ | 705/1 |
| 2003/0023604 A1* | 1/2003 | O'Brien et al. ............. | 707/100 |

\* cited by examiner

Primary Examiner—Krisna Lim

(57) ABSTRACT

The management of end-to-end cooperation among multiple e-service providers is enabled in a distributed correlation manner by locally appending a tag to each outgoing document, with each tag uniquely identifying the transaction to which it is related and identifying management information. The tags are management information structures that are updated at each participating e-service provider. Consequently, in a succession of e-service providers, the parent e-service is furnished with management information for each of the participating e-services and is able to discern the contributions of each such e-service. The different providers maintain separate management information libraries which are used in registration and correlation processes.

18 Claims, 13 Drawing Sheets

E-SERVICE MANAGEMENT THROUGH DISTRIBUTED CORRELATION

TECHNICAL FIELD

The invention relates generally to methods and systems for monitoring electronic services (e-services) and more particularly to enabling distributed correlation for end-to-end determinations of e-service conversations.

BACKGROUND ART

With the widespread deployment of the global communications network referred to as the Internet, the utilization of e-services has become prevalent. E-services are created in the form of portals and e-business websites. E-service providers interact among themselves to extend a range of functionalities to clients. The interaction may take the form of a static composition in which trading partners are generally fixed, but the trend is toward dynamic composition in which e-service providers dynamically choose their trading partners. As one example, an e-service provider of travel services may interact with a number of alternative e-service providers of airline reservations.

An "e-service" is an on-line service that completes tasks, solves problems, or conducts transactions. E-services are accessible on the Internet at a particular Uniform Resource Locator (URL). An e-service provider may depend upon other e-service providers, with the cooperation being either static or dynamic in nature, as previously noted. In FIG. 1, a parent e-service provider 10 may undertake separate conversations 12 and 14 with two other e-service providers 16 and 18. Provider 10 may be an on-line travel service, while the providers 16 and 18 may be airline and hotel services. The provider 16 is shown as engaging in separate conversations 20 and 22 with a pair of sub e-service providers 24 and 26. The sub providers may be competitors in a car service business. Thus, the e-service provider 16 may subcontract related services.

The e-service providers are federated in nature, since they interact across management domains and enterprise networks. The implementations of the e-services may be vastly different and may be based upon any of a number of different platforms. The diversity in their implementations is one reason why it is difficult to manage the overall process.

In order for the e-service providers 10, 16, 18, 24 and 26 to undertake the conversations 12, 14, 20 and 22, there must be an agreed upon document-exchange protocol or protocols. Standardized protocols include CBL, cXML, and EDI. Each conversation consists of multiple exchanges of documents, such as Extensible Markup Language (XML) documents. Each transmission of an XML document is referred to as an "exchange," so that a conversation will consist of multiple XML document exchanges. In its simplest form, a conversation consists of an attempt to enter one transaction, but a conversation can result in multiple transactions or may result in no transaction.

Management of e-service conversations is a challenging task because of the varied, federated, decentralized and distributed nature of e-services. As a single transaction spans multiple e-service providers, it is difficult to implement end-to-end e-service management. Nevertheless, there are motivations for enabling the end-to-end management. Such motivations arise from the perspective of both clients and e-service providers. Clients are interested in tracking their interactions and in understanding the internal e-service process flow. An end-to-end understanding enables the client to seek some insight into the actual e-service flow. Service providers that are using other services to provide composite services, such as the providers 10 and 16 in FIG. 1, would benefit from recognizing how the component service providers are behaving. By understanding and observing the behaviors of sub e-services, a composite e-service would be able to optimize itself by either changing its component sub providers or by instructing the existing component sub providers to improve performance.

Referring now to FIG. 2, a typical e-service receives an http request 28 from the parent e-service 10 (if it is not itself the root service) or from an ultimate consumer at a client device, such as a personal computer. The request is routed from one of the web servers 30 in a web server farm 32 to one of the application modules 34 in an application server farm 36. Thereafter, a module 38 of the e-service business logic 40 is applied to the request and a new request 42 is generated for transmission to at least one sub e-service 24. The request 42 is an http request. Some action is performed at the e-service 24 as a response to the request 42. The e-service 24 then generates a response 44 that is expected by a "listener" 46 attached to the web server farm 32.

After the http response 44 is received from the sub e-service 24, the response is directed to the business logic 40, which generates a second http response 48 that is transmitted to the parent e-service 10. The business logic 40 represents the day-to-day operations that are based upon the resources, capabilities and business rules of the particular e-service 16.

The communication pattern among the three e-services 10, 16 and 24 can vary depending upon the implementation. For example, the application logic at the application server farm 36 can cause an immediate response to be sent to the parent e-service 10, before receiving the response 44 from the sub e-service 24. A final response 48 may then be sent at a later time. Also, the final response can be sent directly to the parent e-service 10 from the sub e-service 24, instead of being routed through the business logic 40 of the intermediate e-service 16. In addition, the format of communication is not "symmetric" in the e-services world. That is, an e-service request may not always have a matching response or a single e-service request may have multiple responses. All of these factors add to the difficulty in monitoring and managing end-to-end e-service transactions. Since there is no single point of control, it is difficult to monitor the requests 28 and 42 and the responses 44 and 48 going into and coming from an e-service and to correlate the documents without knowing the business logic of the e-service. Therefore, e-service conversation and transaction level correlation typically requires intrusive instrumentation.

U.S. Pat. No. 6,108,700 to Maccabee et al. describes a method and program storage device for correlating and collating selected measurement events into transactions that describe the behavior of end-to-end business transactions. The end-to-end business transactions are represented by all of the processing stages, such as the requests and responses, that comprise the business transaction. The Maccabee et al. method measures these processing stages and the communications between them by using sensors. The sensors monitor for selected changes in state using a variety of methods to glean which activities are being achieved. Examples of sensors include (1) software written to interact with software exits by registering for notification of selected conditions, (2) software and/or hardware written to intercept activities taken by the business transaction's software and/or hardware (e.g., interception DLLs or shared libraries, or analysis of output logs or alert messages), and (3) insertion of software and/or hardware probes within the business transaction's software and/or hardware (e.g., Application Response Measurement Application Programming Interface (ARM API) calls within business transaction source code). When appropriate, a sensor generates an event that describes the change in state, when and where it has occurred, and any extra data necessary to uniquely identify the event. The events include any additional correlation data useful for later associating the event with other events to form transactions. The sensors forward the events that they generate to their agents for temporary storage, and in certain cases distribution to other system components that have registered interest in knowing that a particular event has occurred.

While the Maccabee et al. method provides significant insights to the end-to-end business transaction processing, what is needed is a more distributed correlation approach that enables end-to-end correlation of e-service transactions in a decentralized manner.

SUMMARY OF THE INVENTION

Managing business-to-business cooperation among multiple e-service providers is enabled by executing a number of steps at each of the e-service providers. That is, for each provider, local actions are implemented in order to allow localized correlations of provider interactions. For each e-service provider that initiates a transaction (e.g., the parent e-service), a transaction instance is registered. The registration may take place in a management information library that maintains a list of registered transactions. The registration includes assigning a unique transaction identification to the transaction. Also at each e-service provider, a tag is appended to interactions such as requests and responses. The appended tag is typically header information for a document (e.g., an XML document) that represents the interaction. The document includes the unique transaction identification that was assigned to the transaction with which the interaction is associated.

When a response is received from a remote e-service provider, the appended tag is accessed. The appended tag is configured such that its contents are accessible independently of the contents of the response. The tag includes correlation information and management information. The correlation information ("correlator") for a particular transaction instance is made unique by the combination of the assigned transaction identification, a transaction handle that is a locally incremented integer, and an interaction handle that is an incremented integer corresponding to an interaction with a sub e-service. The interaction handles of a specific transaction instance are used to identify the sub e-services' contributions to the transaction's statistics. On the other hand, the management information is indicative of operational parameters that are specific to the responding e-service provider. The operational parameters may include an e-service health index (e.g., up, down, congested, etc.), an indication of e-service availability, an indication of reliability (e.g., the number of faults per number of handled service requests), an indication of performance (e.g., response time or response status), and/or an indication of a fault which occurred when the request was serviced.

Each e-service provider which participates in a transaction updates the management information to include local operational parameters. Consequently, the tag that includes the updated management information identifies a provider tree of transaction interaction and contributions. When the tags are utilized to correlate interactions, a local management information library can provide the information that is necessary for end-to-end conversation management. Moreover, a parent e-service is enabled to perform sub e-service ranking and selection on the basis of factors such as reliability and performance.

As an e-service conversation is undertaken across multiple e-services, the correlation information is employed to track the conversation and to correlate the management information collected at each participating e-service. The tags may be referred to as "management information structures" that include the correlator and a management information object having a policy component and an operational parameter component. Within the conversation across multiple e-services, the management information structures are correlated and updated in order to be sent along with response documents. Management information at every level is collated into a single management information structure which is finally sent in a response to a parent e-service. That is, when an e-service sends its parent a response at the middle or the end of a conversation, the piggybacked management information structure contains the sub management information relevant to the sub e-services involved in the conversation.

Optionally, e-services at each level can further enrich the data collection by agreeing on a certain "e-service specific management information object" (ESSMIO). Such a ESSMIO is defined in a particular schema that enables the collaborating e-services to furnish business logic data, such as the number of book-buy requests that are received. As a result, both the management information and the ESSMIO are updated by an intermediate e-service prior to appending a tag to a response to be transmitted to a parent e-service.

While not critical, Management Information Application Programming Interfaces (MI APIs) may be used in registering, retrieving, and setting the tags.

DETAILED DESCRIPTION

Figure 2:
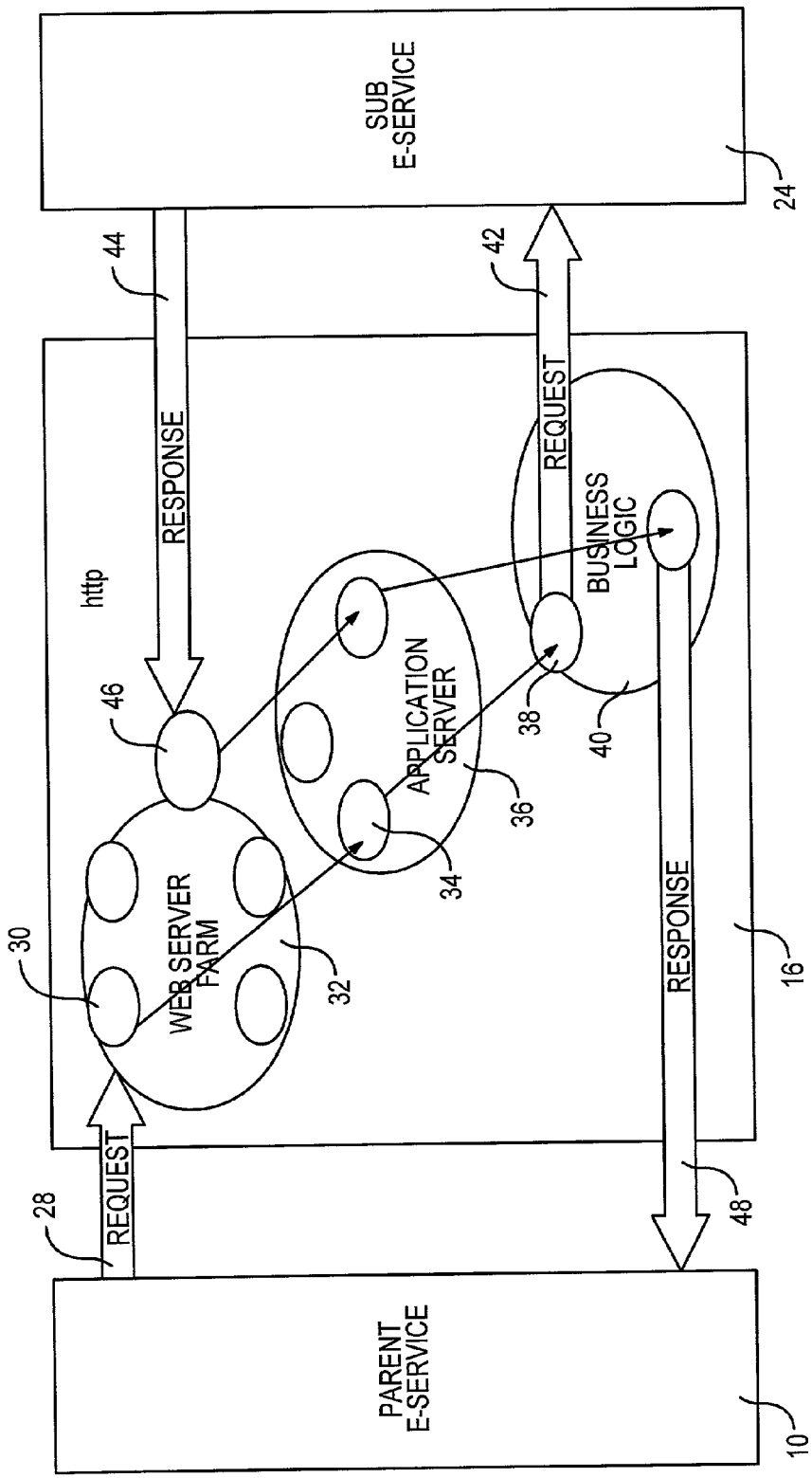
FIG. 2 is a schematic view of components within a particular e-service that is cooperating with other e-services in accordance with known techniques.
Figure 3:
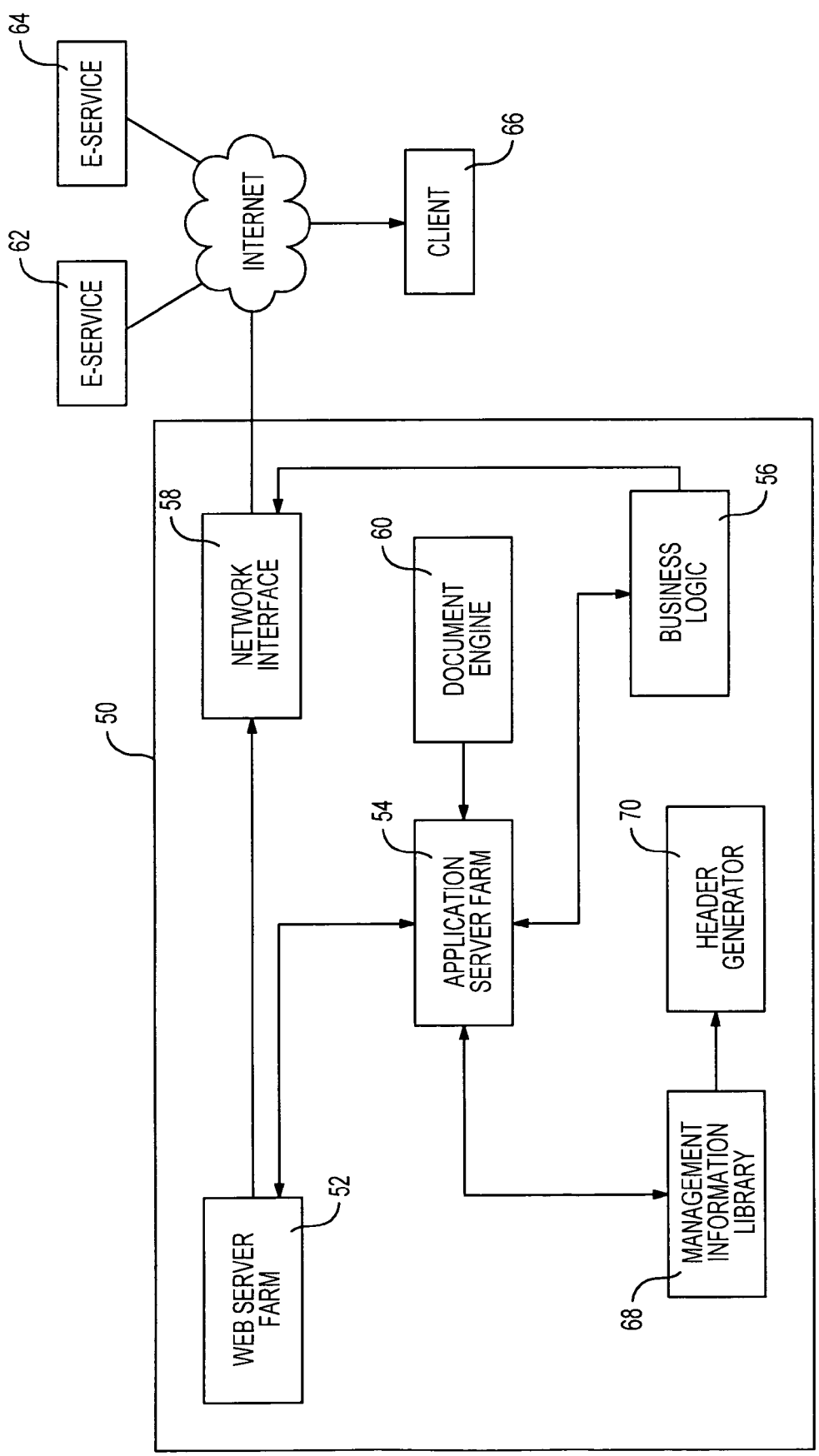
FIG. 3 is a block diagram of components of an e-service system that is configured to implement the present invention.

With reference to FIG. 3, an e-service system 50 includes a web server farm 52, an application server farm 54 and business logic 56 that are conventional components in accordance with the description of FIG. 2. Thus, requests and responses that are received by a server of the web server farm 52 via a network interface 58 may be directed to a module of the application server 54, which cooperates with the proprietary business logic 56 of the system. In one embodiment, the network interface 58 provides access to the global communications network referred to as the Internet, but other applications are contemplated.

The system 50 also includes a document engine 60 that is connected to the application server farm 54. The document engine generates the documents which embody interactions with other e-services 62 and 64 and with clients 66, such as personal computers of end users. While not critical, the document engine may generate XML documents.

In addition to the conventional components, the e-service system 50 includes a management information library 68 and a header generator 70. The header generator 70 forms tags that are appended to documents to be transmitted to another e-service 62 and 64 or the client 66. A problem with providing localized correlation (i.e., distributed correlation) is the fact that request and response documents are usually different documents. The management information (MI) library 68 locally maintains correlation information and updates the correlation information in the header of the documents that are provided to the local system 50. Thus, in order for the distributed correlation approach to operate effectively, cooperation among the e-services is necessary, so as to provide the MI library with the necessary data.

Figure 1:
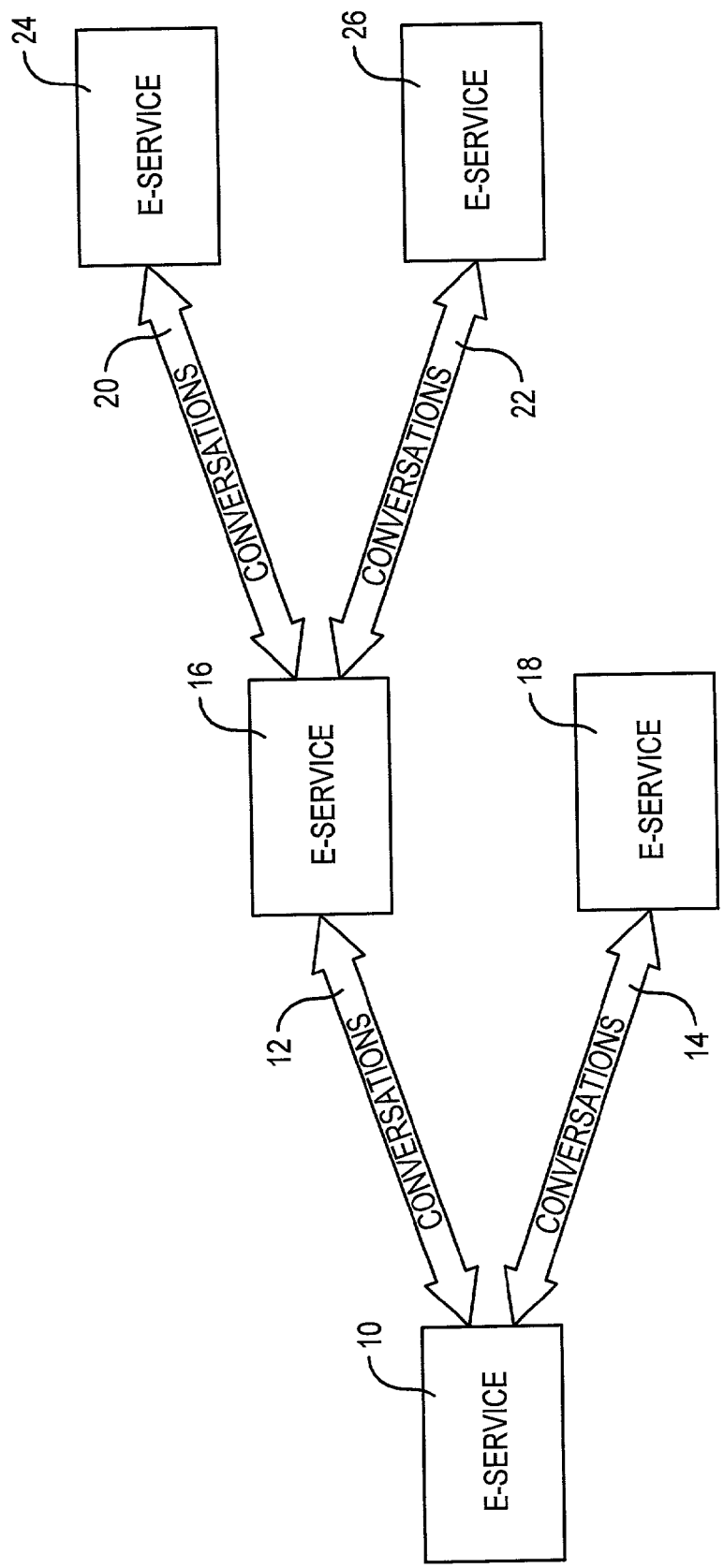
FIG. 1 is a schematic view of the cooperation among e-services in order to provide a composite service, in accordance with known techniques.
Figure 4:
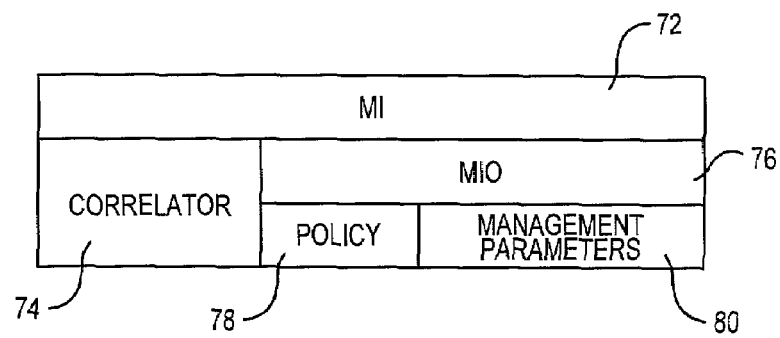
FIG. 4 illustrates one embodiment of a management information structure that is appended to incoming and outgoing documents of the system of FIG. 3.

As described with reference to FIG. 1, e-services sometimes form a tree or a directed acyclic graph, with the different e-services being the nodes and conversations among e-services being the branches. As these trees are created (either statically or dynamically) and as conversations/transactions are performed, management information can be exchanged among the e-services 50, 62 and 64. A protocol in accordance with the invention may be referred to as the "MI protocol," because management information is exchanged among the e-services. FIG. 4 illustrates one embodiment of a header (i.e., tag) that is appended to an outgoing document of an e-service. The header is a management information (MI) structure 72 that includes a correlator 74 and a management information object (MIO) 76. The correlator is comprised of correlation information that uniquely identifies a transaction. As will be described more fully below, in one embodiment the correlator includes a transaction class identifier, a transaction handle that is an incremented integer, and an interaction handle that is an incremented integer that corresponds to an interaction with a sub e-service. The transaction class identifier and the handles combine to identify a particular conversation. The interaction handle of a specific transaction instance is used to identify the sub e-service's contribution to the transaction's statistics.

The MIO 76 of the MI structure 72 consists of a policy 78 and management parameters 80. The policy information may initially be provided by a client. This parameter represents the expectations of a consumer or an e-service provider regarding how a service request should be handled. As one example, a request may be prioritized as either "normal," "silver," "gold," or "platinum." The policy information may include a time constraint and/or other constraints relating to the processing of the requests. The management parameters 80 may be considered to be operational parameters of an e-service that is providing the information. As examples, the management parameters may include an e-service health index, an e-service availability indicator, an e-service reliability indicator, an e-service performance indicator and/or fault information. Preferably, at least two of these five categories of information are included. The e-service health index indicates the current status of an e-service, with possible values being "up," "down," "congested," "halted," "restarting" and "unknown." The availability indicator represents the current or projected availability of the e-service. The availability indicator may be placed in terms of downtime per a designated period of time, with downtime being the duration of e-service unavailability as a result of system or application faults. The reliability indicator may be a measure in terms of fault rate, such as the ratio of faults to service requests. Examples of the performance indicator include response time, response status, throughput/rate, aborted count/rate and failed count/rate. The response time is the duration from the sending of a request to the receiving of a response. The response status indicates if a service request has been responded to, aborted, or failed. The throughput/aborted/failed rate is the number of committed/aborted/failed services per the number of service requests. Finally, a fault parameter contains the information about a fault when a request is serviced. Examples of the fault parameter include a fault identifier, a fault description, and the time at which the fault occurred.

The identified management parameters 80 form a base for the management of e-service conversations. Depending upon how much information one e-service is willing to expose to another, some of the raw parameters can be put into the MIO 76. Thus, the aggregated information can be calculated at the receiving e-service on the basis of the raw parameters. When the raw parameters are provided, the aggregated information need not be placed within the MIO 76. As one example, the MI library 68 of FIG. 3 can locally compute a throughput rate for a remote sub e-service by using a formula such as dividing the number of successful responses by the number of total responses from the sub e-service. The MI structure 72 of FIG. 4 is created by default by the MI library 68 of FIG. 3. If the MI library is a component of an intermediate e-service within a succession of e-services, the management parameters 80 are updated to reflect the local management parameters, but the pre-existing management information is maintained. Similarly, the information within the correlator 74 is updated, so that the parent e-service receives a response document that is tagged with an MI structure containing the full correlator of transaction flow information.

Figure 5:
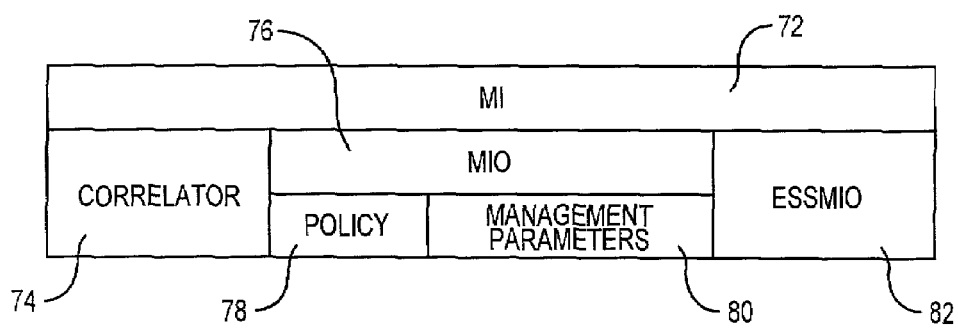
FIG. 5 illustrates an enhanced embodiment of a management information structure.

Referring briefly to FIG. 5, the e-services at each level can further enrich the data collection by agreeing upon a certain e-service specific MIO (ESSMIO) 82 that is added to the MI structure 72. The ESSMIO is defined in a particular schema that enables the collaborating e-services to furnish business logic data, such as the number of book-buy requests that are received. In the same manner as the MIO 76, the ESSMIO is updated at each service to generate a tree which is tagged to a document to be transmitted to another e-service or to a client.

Using the MI structure 72 of FIG. 4 or FIG. 5, when an e-service conversation traverses multiple e-services, the correlation information of the correlator component 74 is required to track the component and to correlate the management information within the MIO component 76 contributed at each participating e-service. As the conversation is executed, the MI structures 72 are correlated and updated, so that they may be tagged to a response document. The management parameters at each level are collated into a single MI structure which is tagged to the final response to the parent e-service. That is, when an e-service transmits a response to its parent at the middle or the end of a conversation, the piggybacked MI structure contains the management parameters relative to the sub e-services involved in the conversation.

An e-service conversation typically begins with a request from a consumer or a parent e-service and ends with a response or a new request to another e-service. In between, one or more interactions between two e-services or between an e-service and a client may be triggered, depending upon how a conversation is defined and implemented. The possible interactions include:

The receiving e-service replies with an immediate response to the initial request. This will be an http response. The actual business-level reply is then sent asynchronously at a later time;

The receiving e-service can receive one or more subsequent requests regarding the same conversation;

The receiving e-service can send one or more requests to at least one remote sub e-service; and The receiving e-service can receive one or more responses from the remote sub e-services.

In order to manage an e-service conversation with the above communication patterns, two issues must be addressed. First, the communication between e-services is "asymmetric." That is, one or more responses can correspond to one request, or a single response may correspond to multiple requests. It is also possible that a responding e-service will send its response directly to the ultimate requester, rather than to its parent. Second, the request and response documents that are sent and received by an e-service can be handled by different threads/components, while each thread/component handles the documents relative to different conversations. To address the two issues, some form of correlation is needed. In accordance with the invention, a set of APIs is used for generating, exchanging, and syndicating MI structures at the cooperating e-services. As a result, an e-service, when receiving a request or response, can associate the document with a specific conversation and can identify a response with a corresponding request. MI APIs enable getting and setting of the management information objects 76 described with reference to FIGS. 4 and 5.

Two types of information are collected from e-services. One type is descriptive information, which contains the e-service and transaction definitions. The other is the management information, which contains the data for each instance of a conversation. The management information is part of the MI definition which will be described below.

The descriptive information is provided in the class MITranRegistration. An e-service, when getting started, initiates an instance in this class and calls registration method MI_register_transaction to define the mapping from a universally unique transaction class ID to a name pair (service, transaction). There are two versions of MI_register_transaction. The version that is used in a particular case depends upon whether the interaction ID is provided as a parameter or is generated by the MI library 68 of FIG. 3. The MI library maintains a list of registered transactions. When the method MI_register_transaction is called, a new entry is added in the list. The definition of the class is as follows:

```
public class MITranRegistration extends Object {
//Public Constructors
    public   MITranRegistration( );
//Public Instance Methods
    public short    MI_register_transaction(
                        String   service_URI,
                        String   tran_name,
                        byte[ ]  tran_id;
                        int      flags) ;
    public byte[ ]  MI_register_transaction(
                        String   service_URI,
                        String   tran_name,
                        int      flags) ;
//misc . . .
}
```

The management information is provided in the class MiServiceTran. This class represents e-service transactions when they execute. An e-service creates as many instances as it needs. Typically, this is at least as many as the number of transactions that can be executed by the e-service simultaneously. An e-service can create a pool of MiServiceTran objects, can take one such object from the pool to use when a transaction starts, and can return the object to the pool after the transaction ends, so that the object can be reused. Internally, each entry in the list of registered transactions has a list of transaction instances. Each entry contains the MI structure of a specific transaction instance. When a new instance of a transaction class is started, a new entry is allocated and added in the corresponding instance list. As previously stated, the contained MI structure is updated at each stage of the transaction. The maximum length of a transaction instance list depends on the system configuration. The definition of the class MIServiceTran is as follows:

```
public class MIServiceTran extends Object {
//Public Constructors
  public MIServiceTran( ) ;
//Public Instance Methods
  public Policy MI_getPolicy
                    (Document document
                     int doc_type) ;
    public long MI_start(byte[ ] tran_id,
                    long ptran_handle;
                    ESSMIO essmi_object,
                    int flags) ;
    public long MI_start(byte[ ] tran_id,
                    long ptran_handle,
                    long tran_handle,
                    ESSMIO essmi_object,
                    int flags) ;
    public long MI_update(long tran_handle,
                    ESSMIO essmi_object,
                    int flags) ;
    public Document MI_sendReq
                    (Document document,
                     int doc_type,
                     long tran_handle,
                     Policy req_policy,
                     ESSMIO essmi_object,
                     int flags) ;
    public long MI_recvReq
                    (Document document,
                     int doc_type,
                     long tran_handle,
                     ESSMIO essmi_object,
                     int flags) ;
    public Document MI_sendRep
                    (Document document,
                     int doc_type,
                     long tran_handle,
                     ESSMIO essmi_object,
                     int flags) ;
    public long MI_recvRep
                    (Document document,
```

-continued

```
                    int doc_type,
                    long tran_handle,
                    ESSMIO essmi_object,
                    int flags) ;
        public long MI_stop(long tran_handle,
                    int tran_status,
                    ESSMIO essmi_object,
                    int flags) ;
        //misc for getting MIO and ESSMIO. . .
    }
```

Figure 6:
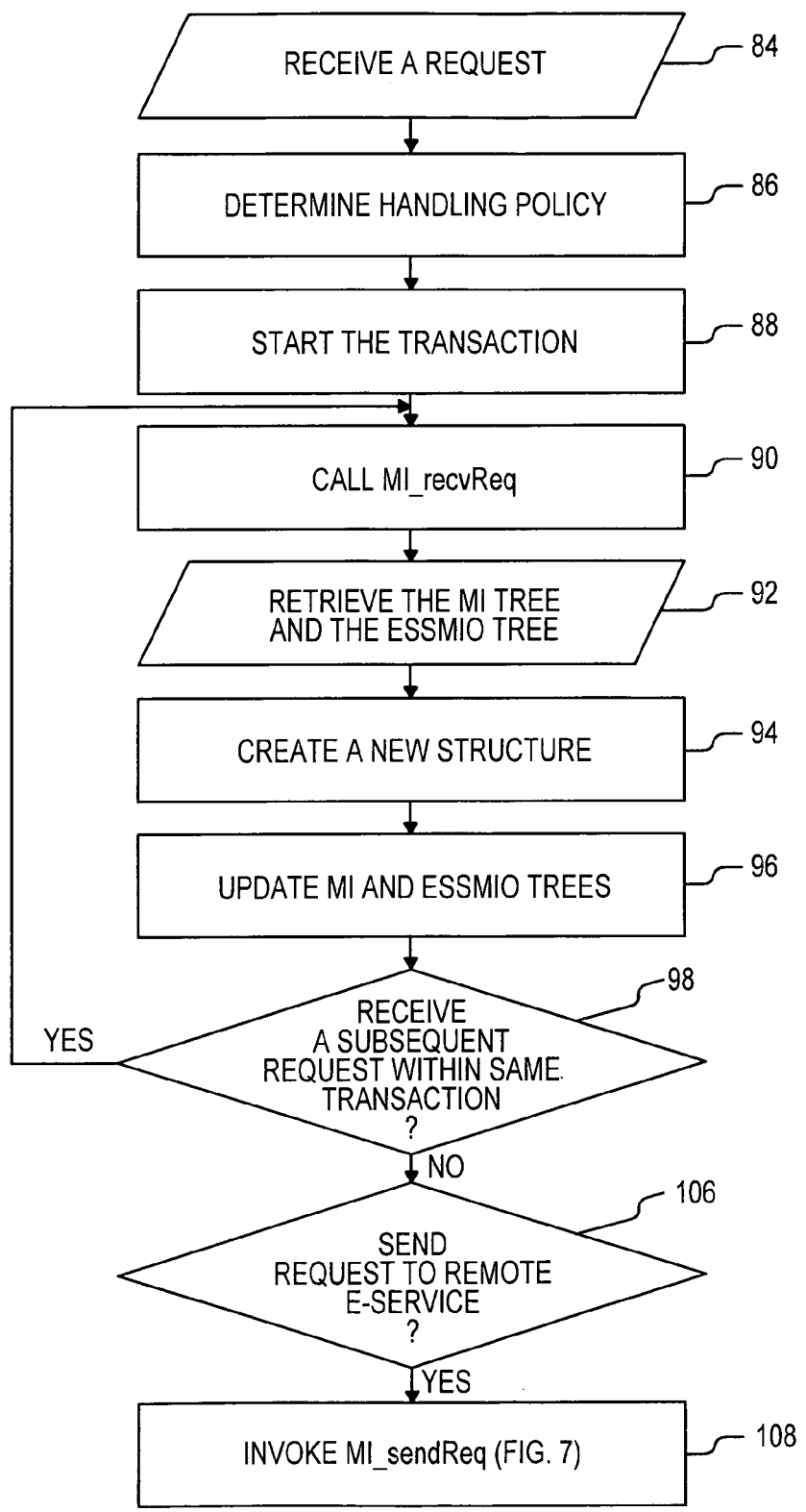
FIG. 6 is a process flow of steps that are followed by the system of FIG. 3 when a request document is received.

FIG. 6 is a process flow of steps that are followed when a request is received from a parent e-service or from a consumer. At step 84, the request is received at the e-service. While not critical, the request is typically an XML document. As a result of receiving the document, MI_getPolicy is invoked to retrieve from the document the policy containing the information regarding how the service request should be handled from the perspective of the client. Thus, at step 86, the handling policy is determined.

At step 88, the method MI_start is used to initiate a transaction. There are two versions of MI_start, with the selection of the version being determined by whether a transaction handle is provided by the user or is generated by the MI library 68 of FIG. 3. The other parameters of this method include the transaction class ID, the parent transaction handle, and the ESSMIO that was described as an optional component when referring to FIG. 5. The transaction class ID is the type of transaction to which the particular transaction instance (the transaction handle) belongs. The parent transaction handle associates this transaction with its parent transaction, if any. The ESSMIO is used to contain the business logic information that is relevant to the transaction, if any.

If the transaction is a result of receiving the service request from a remote e-service, the method MI_recvReq is called at step 90 by providing the transaction handle and the received document. MI_recvReq retrieves the MI and ESSMIO trees from the document header (tag) at step 92 and creates a new MI structure at step 94. In FIG. 5, the new MI structure 72 will include the correlator 74 and the management information object 76 for the particular transaction instance. Then, MI_recvReq updates the MI and ESSMIO trees at step 96 by appending the transaction's MI/ESSMIO to the MI/ESSMIO trees retrieved from the document and by associating the paths with the transaction instance. The resulting MI and ESSMIO trees are used to identify this class instance in the context of the containing e-service conversation. Moreover, the trees present the corresponding management statistics. The correlator 74 for the transaction instance is made unique by the combination of (1) the transaction class ID, (2) the transaction handle which is an incremented integer, and (3) the interaction handle which is an incremented integer and which corresponds to an interaction with a remote sub e-service. The ID and handles of transactions participating in a conversation are combined to identify the conversation. The interaction handles of a specific transaction instance are used to identify the remote sub e-service's contributions to the transaction's statistics.

As previously noted, an e-service can receive a second request from a parent e-service during a transaction. In decision step 98, a determination is made as to whether a subsequent request is within the same transaction. If yes, the process returns to step 90, so that MI_recvReq is again invoked by providing the same transaction handle, the new received document, and the updated ESSMIO of the transaction, if any. In step 96, the MI tree and the ESSMIO tree are again updated with the retrieved and passed information.

Figure 7:
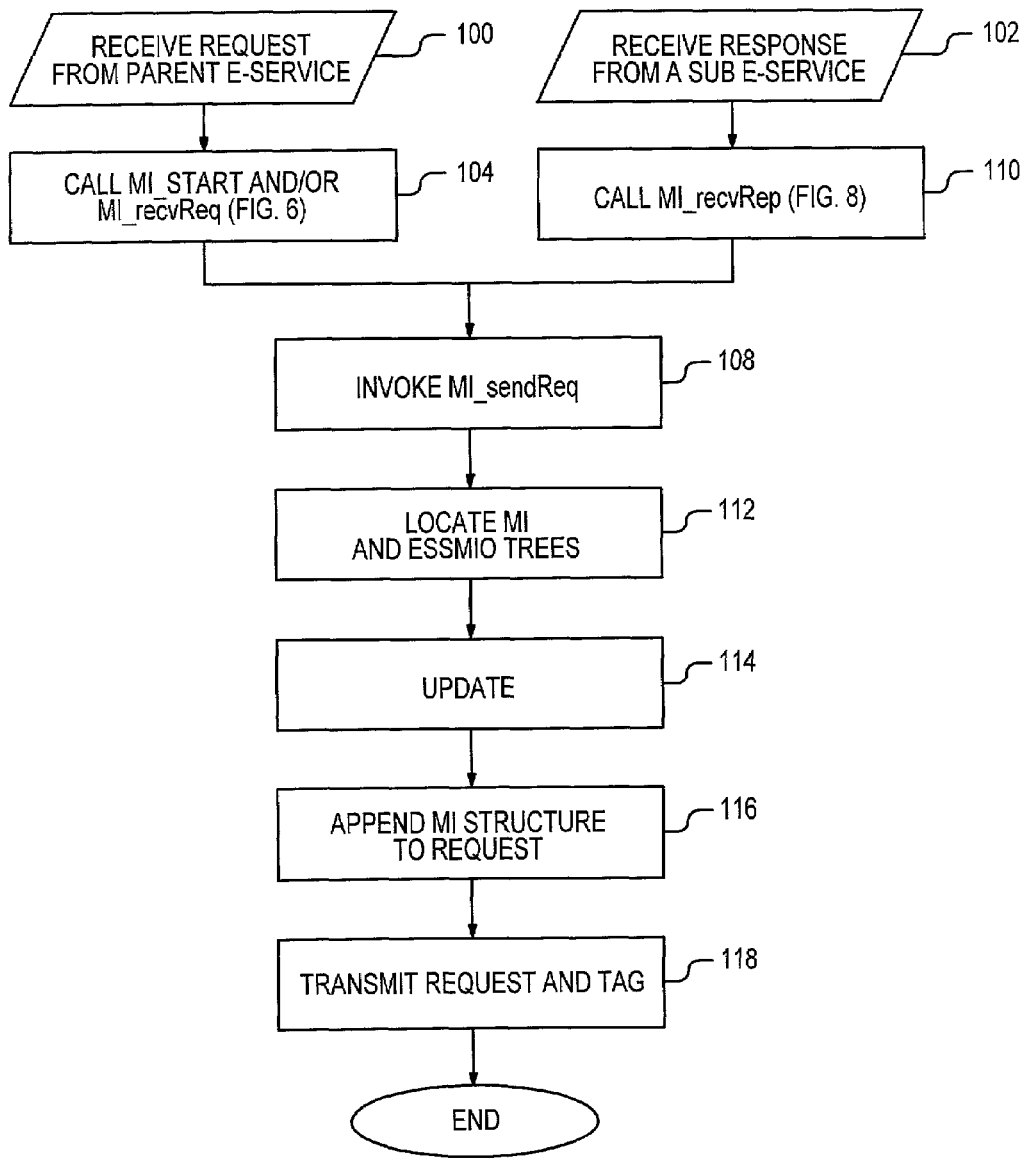
FIG. 7 is a process flow of steps that are followed by the system of FIG. 3 in sending a request document.

FIG. 7 is a process flow of steps that are followed in sending a service request to a remote e-service that is a sub e-service. The process may be triggered by either receiving a request from a parent e-service at step 100 or by receiving a response from the remote e-service at step 102, where the response requires follow-up. If the triggering action is the receiving of the request from the parent e-service at step 100, the receiving e-service follows the sequence of steps that were identified in FIG. 6, as represented by step 104 in FIG. 7. Referring briefly to FIG. 6, the decision step 106 determines whether a request is needed to be sent to a remote e-service, so that an affirmative response at step 106 causes the method MI_sendReq to be invoked at step 108, which is shown in both FIGS. 6 and 7. On the other hand, if the process is triggered by receiving the response from the sub e-service at step 102 of FIG. 7, the method MI_recvRep is called at step 110. The process that is invoked by calling MI_recvRep will be described later with reference to FIG. 8. For either triggering process, the step 108 is reached.

At the step 108 of invoking MI_sendReq, the parameters include the request document to be sent, the transaction handle, and the updated ESSMIO, if the transaction's e-service specific management information has changed. A policy can also be provided to indicate how the request should be serviced. The transaction handle is used to locate the MI and ESSMIO trees of the transaction, as indicated at step 112. If a policy and/or an updated ESSMIO are supplied, MI_sendReq will use them to update the MI structure accordingly. The MI_sendReq method is invoked to perform two tasks. First, the MI library 68 of FIG. 3 records the start of a new service interaction for this transaction instance. Second, the proper MI and ESSMIO trees for the outgoing request document are generated. The two tasks are represented by the update step 114 in FIG. 7. The resulting MI structure includes the management information and ESSMIO for the transaction instance and includes all of the information from predecessor e-services. However, the MI structure excludes such information from remote e-services with which the transaction previously interacted.

The MI structure is appended to the request document at step 116. The MI structure is a tag that includes the generated MI and ESSMIO trees. The tag is separately accessible from the request document, since it is appended as header information. The request document and its tag are then transmitted at step 118.

Figure 8:
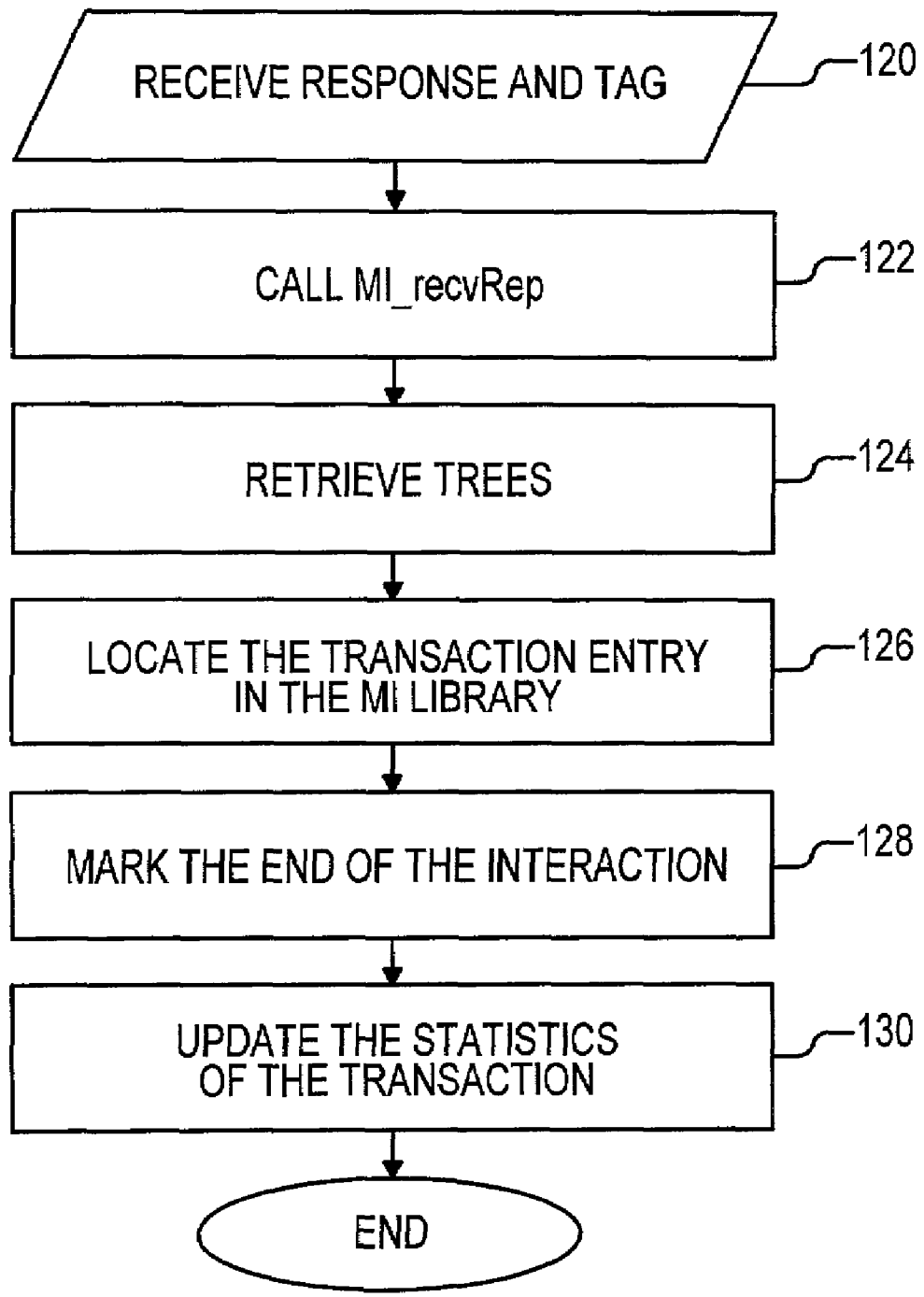
FIG. 8 is a process flow of steps that are followed by the system of FIG. 3 when a response document is received.

FIG. 8 represents the process flow of steps that are followed when a response document is received at an e-service. At step 120, the response and its tag (MI structure) are received from a remote e-service via the Internet. As a result, the method MI_recvRep is invoked at step 122. Execution of this method retrieves the MI and ESSMIO trees at step 124. These trees contain the latest conversation path and the management statistics relevant to the latest interaction. Then, the method uses the transaction handle to locate the entry of the transaction in the local MI library (step 126). The end of the interaction is marked at step 128 and the statistics of the transaction are updated at step 130, using the received and retrieved management information and ESSMIO.

An e-service may send back some preliminary or final result before or at the end of a transaction. If this occurs, the current conversation path and its statistics at each participating e-service tier need to be send back with the response document. This is done within the appended tag of the response document. Also, the context of the transaction needs to be updated, so that any subsequent response will not contain the statistics and e-service interactions prior to this point. To achieve this, method MI_sendRep is invoked by providing the document to be sent, the transaction handle, and the ESSMIO of the transaction, if updated. With the transaction handle, MI_sendRep locates the context of the transaction, provides the update, and summarizes its statistics. Then, the method generates the MI and ESSMIO trees containing the statistics of the transaction and the breakdowns at each participating e-service tier. Finally, MI_sendRep inserts the generated MI and ESSMIO trees into the appended tag of the response document before they are returned.

The method MI_end is used to inform the MI library of the end of a transaction. Moreover, the method summarizes the statistics. The MI library is informed of the status of the completed transaction. If the application logic finishes successfully, the status is set to MI_GOOD. On the other hand, if the service request is not satisfied (e.g., the service could not reserve a hotel room due to a lack of vacancies) the status is set to MI_ABORTED.

The status is set to MI_FAILED if there is an application or a system failure (e.g., a sub e-service was unavailable).

The APIs provided by the MI library 68 of FIG. 3 can be classified into three categories: registration, demarcating business transactions, and tracking interactions/conversations with the outside world. When an application/e-service starts, it calls MI_register_transaction to register the types of transactions it provides. During runtime, MI_start begins an instance of a registered transaction, while MI_stop is called to end the transaction instance. In between, the application/e-service calls MI_sendReq, MI_recvReq, MI_sendRep, or MI_recvRep when sending or receiving a request or response.

Figure 9:
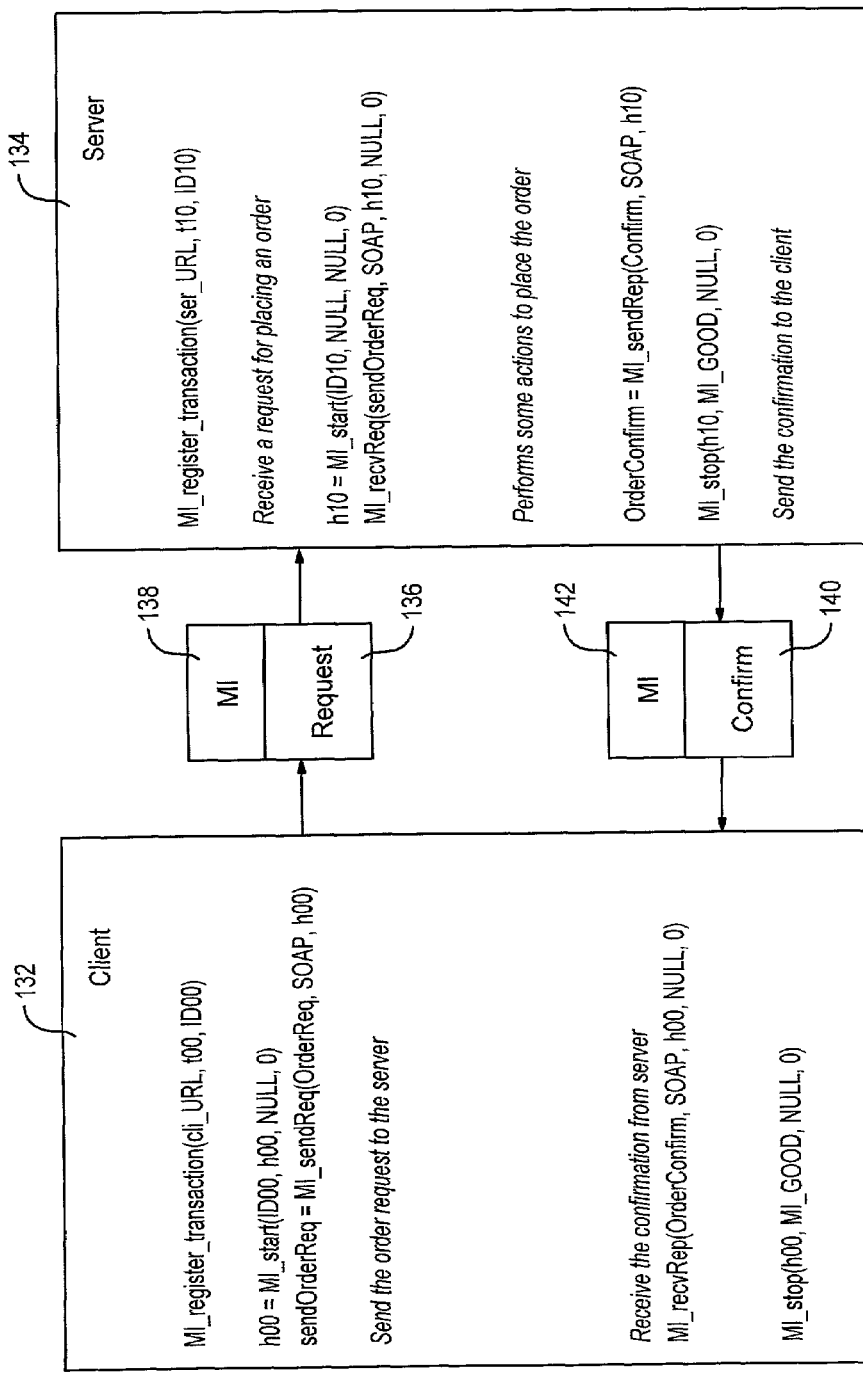
FIG. 9 is a simplified example of the operations of FIGS. 6-8.
Figure 10:
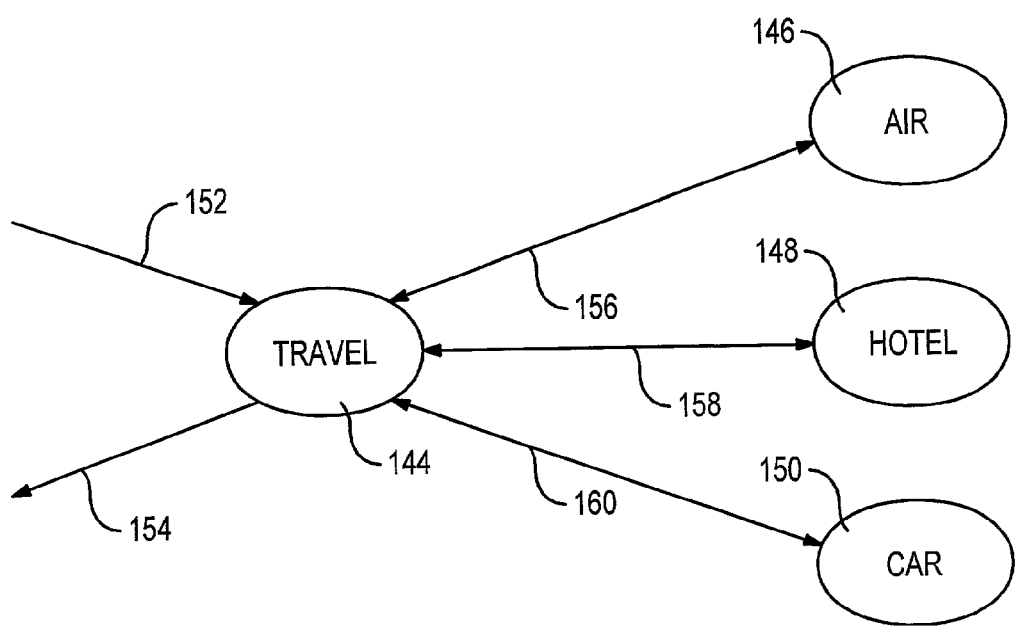
FIGS. 10-14 illustrate a more complex example of the operations of FIGS. 6-8.
Figure 11:
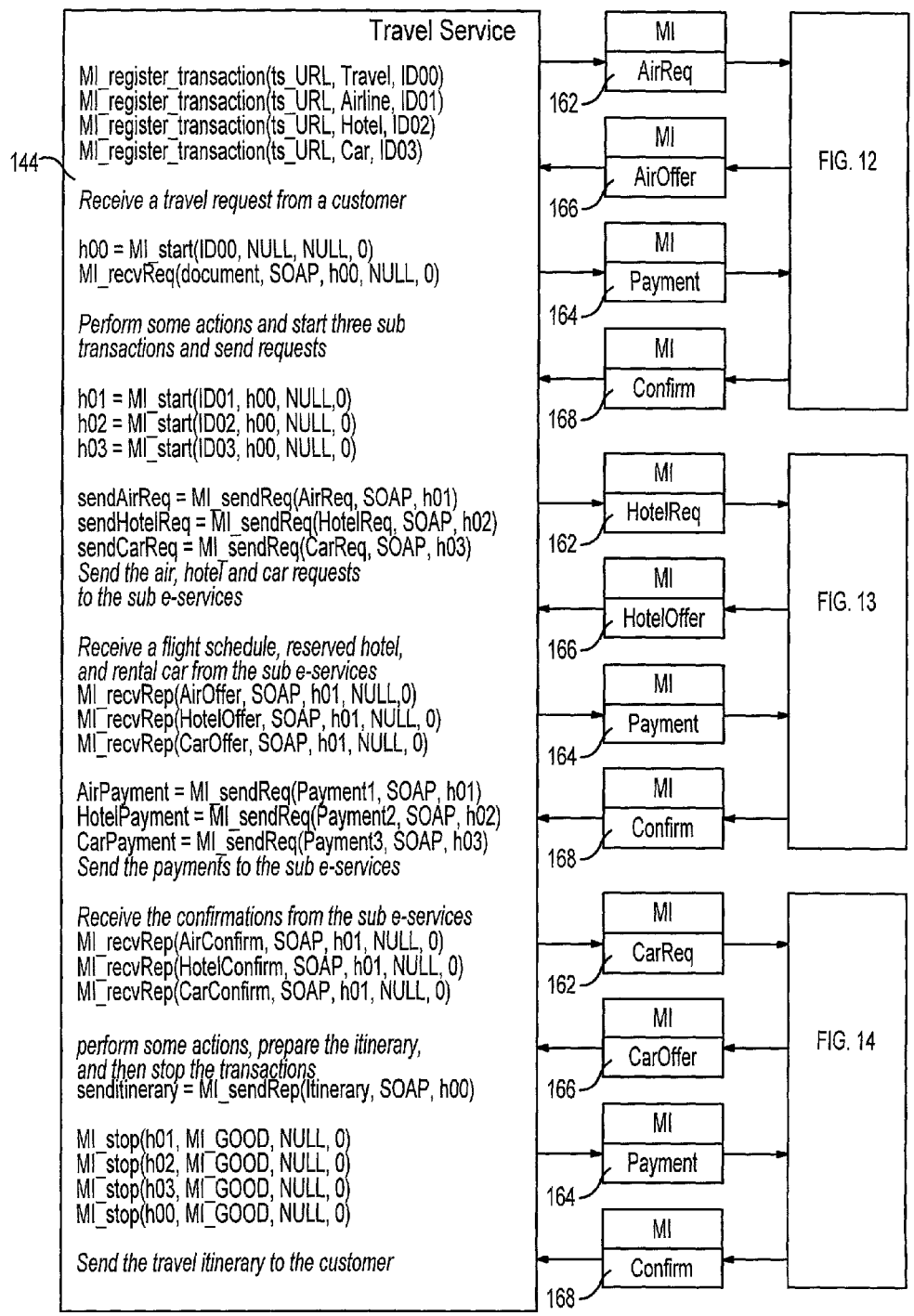
Figure 12:
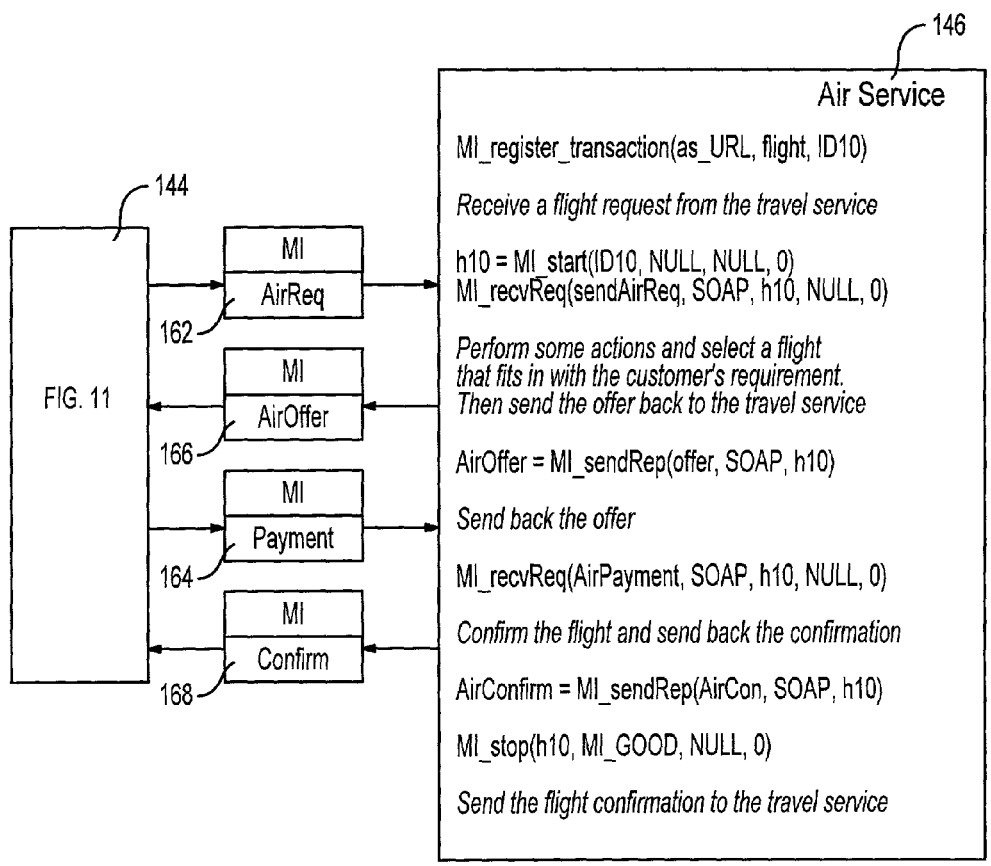
Figure 13:
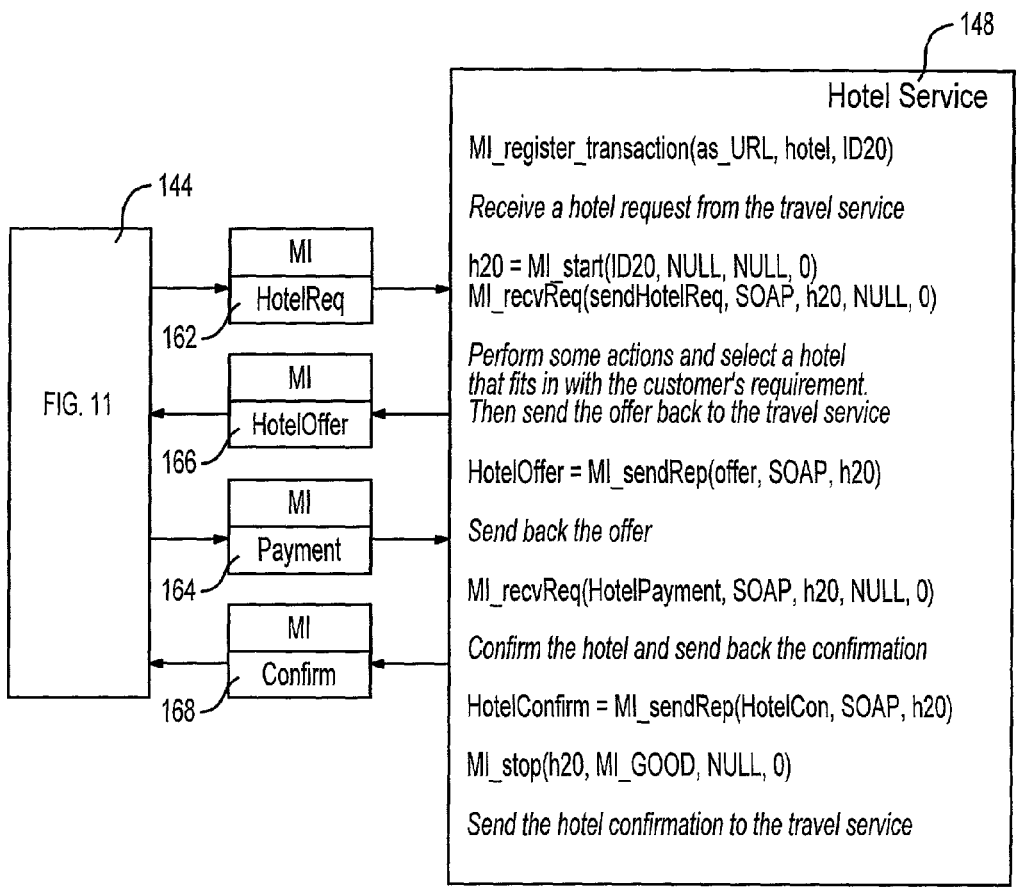
Figure 14:
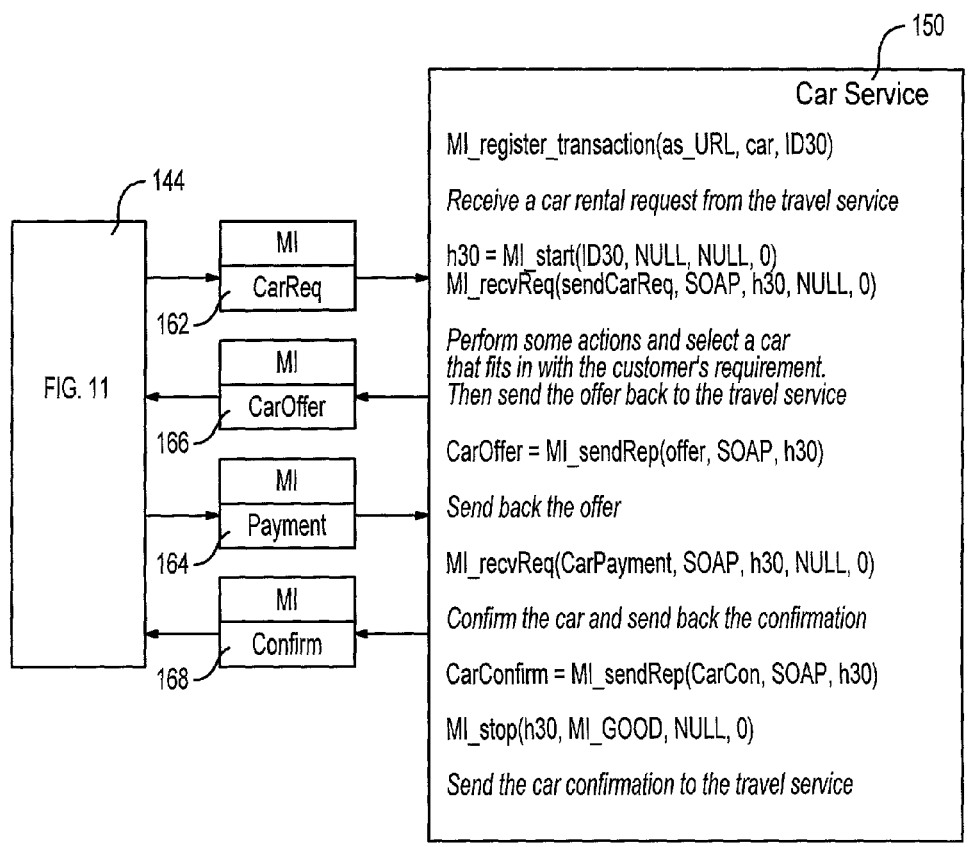

FIG. 9 shows a simplified example of operations in which a client 132 has a conversation with a server 134 in order to place an order. Information regarding the order is transmitted in a request document 136 having separately accessible information within an appended MI structure 138. Upon receiving the request document, the server invokes methods MI_register_transaction and MI_recvReq, as described with reference to FIG. 6. Actions are then performed on the basis of business logic. The order confirmation is sent in an XML document 140 having a tagged MI structure 142. The transmission of the confirmation document involves invoking the methods MI_sendRep and MI_stop. When the confirmation document and MI structures are received at the client 132, the steps of FIG. 8 are executed. This includes invoking the methods MI_recvRep and MI_stop.

A more realistic example of the invention is represented in FIGS. 10-14. This example is somewhat more complex than the one of FIG. 9, but still shows only two tiers of e-services. The first tier is a travel e-service 144, while the second tier includes three sub e-services 146, 148 and 150. Interactions with a customer are represented by input and output lines 152 and 154. Conversations between the parent travel e-service 144 and the sub e-services are represented by the bidirectional lines 156, 158 and 160. In these conversations, documents are exchanged between the travel e-service and the airline, hotel and car rental e-services.

FIGS. 11-14 illustrate how the set of MI APIs is used to instrument the transactions between the travel e-service 144 and its three sub e-services 146, 148 and 150. Although the conversations in the example are symmetric, the MI library and its API also support an asymmetric conversation model. Moreover, a transaction can cross different threads/components. In other words, the methods of MI_start, MI_recvReq, MI_sendReq, MI_sendRep, MI_recvRep, and MI_stop for one transaction can be called by different threads/components.

As a result of the implementation of the invention, each of the three conversations 156, 158 and 160 includes transmissions of a tagged request document 162 and a tagged payment document 164 from the travel e-service to each sub e-service and further includes transmissions of a tagged offer document 166 and a tagged confirmation document 168 from the sub e-service to the travel e-service.

Returning to FIGS. 3 and 4, each MI structure 72 contains the correlator 74 that was described above. The correlator identifies the context of the transaction within a conversation. It is transparently handled by the MI library 68 of the particular e-service provider 50. In one example, its schema is:

```
<complexType   name    = "CorrelatorType">
   <element    name    = "TranID"   type = "string" />
   <element    name    = "TranHandle"
               type    = "decimal" />
   <element    name    = "InteractionID"
               type    = "decimal" />
</complexType>
```

The policy 78 of the MIO 76 sets a priority for the service request. It can also set quality of service (QoS) parameters that indicate how and when the request should be serviced. An exemplary schema is:

```
<complexType  name    = "PolicyType">
   <element name    = "Priority"  type      = "decimal"
      minOccurs     = "0"  maxOccurs  = "1">
   <element name    = "SLO"       type      = "SLOType"
      minOccurs     = "0"  maxOccurs  = "unbounded">
<complexType>
<complexType  name    = "SLOType">
   <element  name   = "Term"       type = "string" />
   <element  name   = "Constraint" type = "string" />
   <element  name   = "Threshold"  type = "string" />
</complexType>
```

Currently, the management parameters 80 in each MIO 76 contain the identity (i.e., URL for a consumer or service provider), as well as the performance, availability, and reliability statistics. A possible schema is:

```
<complexType  name   = "MeasurementType">
   <element   name   = "Identity"   type = "IDType"/>
   <element   name   = "Performance"
              type   = "PerfType" />
   <element   name   = "Availability"
              type   = "AvailType" />
</complexType>
<complexType  name   = "IDType">
   <element   name   = "From"   type = "serviceURI" />
   <element   name   = "to"     type = "serviceURI" />
</complexType>
<complexType  name   = "PerfType">
   <element   name   = "RespTime"   type="decimal" />
   <element   name   = "StartTime"  type="decimal" />
   <element   name   = "StopTime"   type="decimal" />
   <element   name   = "TranStatus"
              type   = "decimal" />
</complexType>
```

-continued

```
<complexType name = "AvailType">
    <element  name = "ReqCount"   type = "decimal" />
    <element  name = "ComCount"   type = "decimal" />
    <element  name = "FailCount"  type = "decimal" />
    <element  name = "AbortCount"
                    type = "decimal" />
</complexType>
```

The MIO 76 consists of the policy 78 and the management parameters 80. The schema of the MIO may be as follows:

```
<complexType name = "MIOType" >
    <element    name      = "Policy" type="PolicyType"
      minOccurs           = "0" maxOccurs = "1">
    <element    name      = "MeasuredData"
                type      = "MeasurementType"
      minOccurs           = "0" maxOccurs = "1">
</complexType>
```

The correlator 74 and MIO 76 construct the MI structure 72 that is used to identify the local context of the transaction and the statistics. The schema may be as follows:

```
<complexType name = "MIType" >
    <element    name  = "ParentCorrelator"
                type  = "CorrelatorType"
                minOccurs = "0" maxOccurs = "1">
    <element    name  = "Correlator"
                type  = "CorrelatorType" />
    <element    name  = "MIO" type="MIOType" />
</complexType>
```

To identify a service request in the context of a conversation, an e-service needs to access the MI structure 72 and its predecessors. For the purpose of determining how its sub e-services perform, a parent e-service needs to get the management information of the participating e-services. MITree is defined to serve this need. The structure is piggybacked on the documents exchanged among e-services. A possible schema is as follows:

```
<element  name = "MITree"
          type = "MITreeType" />
<complexType name = "MITreeType" >
    <element    name  = "predecessor"
                type  = "MIType"
                minOccurs = "0" maxOccurs = "unbounded">
    <element    name  = "MI"
                type  = "MIType" />
    <element    name  = "Child"
                type  = "MIType"
                minOccurs = "0" maxOccurs = "unbounded"
</complexType>
```

By aggregating and analyzing MIOs 76, the MI library 68 can provide the necessary information that higher level management agents can employ to perform a number of management tasks. Firstly, the information may be used for end-to-end conversation management. The information enables an e-service or a consumer to track its interactions with other e-services and to track the e-service flow. Secondly, the information helps an e-service perform e-service ranking and selection. An e-service can rank its remote e-service providers based on their performance, availability, and reliability. The latest statistics of the remote e-services can also help the local e-service in the selection of alternative e-service providers. Thirdly, the information enables service optimization. By identifying performance bottlenecks and service failure points, the management agents can reconfigure and/or restart the e-service to achieve better performance and availability. It also helps in e-service evolution. An e-service provider usually provides different types of services. The information provided by the MI library 68 could be used to monitor the access patterns of the provided services and to help in decisions regarding whether or how to evolve the non-performing services to generate more revenue. Lastly, the information enables consumer tracking. The information can be used to ascertain consumer patterns, so that actions can be taken to guarantee QoS for valued consumers.

Optionally, some control may be exercisable on the dissemination of management information from one e-service tier to another e-service tier. For example, depending upon any agreements between cooperating e-services, MIOs can be suppressed or added to the relevant Management Information Structure (MIS).

The protocol which has been described operates well for web-based services using messaging protocols such as SOAP and the like. Thus, the correlator information can be passed in the header of the SOAP messages exchanged between cooperative web services. This mechanism can be used for message tracking, conversation tracking, and transaction management.

What is claimed is:

1. A method of managing business-to-business cooperation among multiple electronic service providers which enter transactions using computer processing, said method comprising the steps of:

enabling distributed interaction correlation processing among said electronic service providers by attaching tags to transmission interactions among said electronic service providers, said transmission interactions including requests and responses relating to said transactions, each said tag including information that uniquely identifies a particular transaction that is related to the transmission interaction to which said tag is attached, each said tag that is attached to one of said responses including management information indicative of operational parameters that are specific to a responding electronic service provider transmitting said response and indicative of operational parameters specific to all other electronic service providers from which management information was received by said responding electronic service provider in tags attached to same-transaction responses from said other electronic service providers, said management information being accessible separately from said responses; and utilizing information within said tags to correlate said transmission interactions with said transactions, including identifying said operational parameters of said responding electronic service provider and said any other electronic service provider when one of said responses is received by an originating site in a succession of said electronic service providers that are cooperative in entering a specific transaction.

2. The method of claim 1 wherein said attaching of said tags is executed by appending headers to electronic documents, said electronic documents being said transmission interactions.

3. The method of claim 1 wherein said electronic service providers are separate business enterprises that engage in transactions via the global communications network referred to as the Internet, said step of enabling distributed interaction correlation processing including forming said tags to include correlation information that uniquely identifies a specific transaction and to include management information, said management information including said operational parameters when said management information is included in a tag attached to one of said responses.

4. The method of claim 3 wherein said step of forming said tags includes providing said management information to include a plurality of (1) an electronic service health index, (2) an availability of a specific electronic service, (3) an electronic service reliability index, (4) an electronic service performance index, and (5) indications of faults at an electronic service provider.

5. The method of claim 4 wherein said step of forming said tags further includes providing business logic data that identifies current business processing of a specific electronic service provider.

6. The method of claim 4 wherein said step of forming said tag includes preserving said management information for each said electronic service provider in said succession such that a tree of management information is formed, with each electronic service provider in said succession adding management information to said tree.

7. The method of claim 1 further comprising utilizing Application Programming Interfaces (APIs) to initiate transaction registration and document-to-transaction correlation processes at each of said electronic service providers, said document-to-transaction correlation process being an implementation of said step of utilizing said tags to correlate said transmission interactions.

8. The method of claim 7 wherein said step of utilizing said APIs further includes introducing an API to update said management information at each said electronic service provider in said succession.

9. A method of managing business-to-business cooperation among multiple electronic service (e-service) providers which enter transactions using computer processing, wherein for each e-service provider said method comprises the steps of:
  locally registering each potential transaction initiated by said e-service provider, including assigning a unique transaction identification to each said potential transaction;
  locally appending a tag to each request transmitted to a remote e-service provider, said tag including a specific said transaction identification assigned to a transaction with which said request is associated;
  receiving responses from said remote e-service providers, including receiving appended tags with said responses, each said appended tag including the specific transaction identification assigned to the transaction with which said response is directed and including management information indicative of management parameters for each said remote e-service provider with which interaction occurred in generating the particular response of said appended tag, each appended tag thereby indicating a provider tree of transaction interaction;
  updating said management information to include local management parameters in each said tag for which a received response from a responding remote e-service provider is relevant to a received request from a requesting remote e-service provider, including updating said provider tree to indicate local transaction interaction;
  transmitting responses to requesting remote e-service providers, including appending a specific tag that is indicative of a specific transaction and a specific provider tree for each said response; and
  locally correlating said requests with said responses using said tags, thereby enabling local determinations of end-to-end transaction management.

10. The method of claim 9 wherein said step of appending said tag includes generating a management information structure having a correlation component and a management information object component, said step of appending further including forming said tag as header information for transmission with an independently accessible document, said responses and said requests being said documents.

11. The method of claim 10 wherein said step that includes generating said management information structure includes providing said correlation component to identify a transaction instance and an interaction number.

12. The method of claim 11 wherein said documents are Extensible Markup Language (XML) documents.

13. The method of claim 9 wherein said step of locally registering each potential transaction includes registering a transaction instance in a management library maintained at said each e-service provider.

14. An electronic service (e-service) provider system comprising:
  a document engine configured to generate e-service documents, including requests and responses;
  a management library having storage for registering transaction instances, such that each said transaction instance has a unique identification;
  a header generator for appending header information to each said e-service document generated by said document engine, said header information including said unique identification of a specific transaction instance which corresponds to said e-service document for which said header information is generated and further including management information relevant to handling of said specific transaction instance, said header generator being configured to update remote management information received from a responding remote e-service provider when said management information is forwarded as updated header information with a response to a second remote e-service provider, such that updated header information includes management information for each response in a succession of responses;
  a network interface connected to transmit and receive said e-service documents and separately accessible header information to and from said responding remote and second remote e-service providers via a network; and
  a correlation engine configured to cooperate with said management library to correlate said e-service documents on a basis of said header information and said updated header information received via said network interface, thereby enabling end-to-end determinations of transaction management.

15. The system of claim 14 wherein said network interface enables connectivity to the Internet, said system and said remote e-service providers being peer systems.

16. The system of claim 14 wherein said header generator is configured to generate management information (MI) structures having a policy component and having an MI component that contains said management information, said policy component being indicative of a policy for handling a transaction with which said MI structure is directed.

17. The system of claim 16 wherein said header generator is further configured to generate said MI structures to include a component that is indicative of business logic of said system, where said business logic of a particular MI structure is relevant to said transaction to which said MI structure is directed.

18. The system of claim 14 wherein said correlation engine and said management library are configured to be responsive to Application Programming Interfaces (APIs).

* * * * *